United States Patent
Osako et al.

(10) Patent No.: US 10,072,513 B2
(45) Date of Patent: Sep. 11, 2018

(54) RADIAL TURBINE

(71) Applicant: MITSUBISHI HEAVY INDUSTRIES, LTD., Tokyo (JP)

(72) Inventors: Katsuyuki Osako, Tokyo (JP); Takao Yokoyama, Tokyo (JP); Yasuaki Jinnai, Tokyo (JP); Takashi Shiraishi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 451 days.

(21) Appl. No.: 14/360,846

(22) PCT Filed: Nov. 14, 2012

(86) PCT No.: PCT/JP2012/079504
§ 371 (c)(1),
(2) Date: May 27, 2014

(87) PCT Pub. No.: WO2013/080795
PCT Pub. Date: Jun. 6, 2013

(65) Prior Publication Data
US 2014/0341729 A1    Nov. 20, 2014

(30) Foreign Application Priority Data

Nov. 30, 2011   (JP) ................................. 2011-261737

(51) Int. Cl.
*F01D 9/02* (2006.01)
*F02B 37/24* (2006.01)
(Continued)

(52) U.S. Cl.
CPC ............... *F01D 9/02* (2013.01); *F01D 5/141* (2013.01); *F01D 17/165* (2013.01); *F02B 37/24* (2013.01);
(Continued)

(58) Field of Classification Search
CPC . F01D 1/08; F01D 5/145; F01D 5/148; F01D 5/141; F01D 9/045; F01D 9/048; F01D 9/02; F01D 9/026
See application file for complete search history.

(56) References Cited

U.S. PATENT DOCUMENTS 2,801,790 A * 8/1957 Doll, Jr. ................. F04D 29/542
                                                            415/192
6,036,438 A * 3/2000 Imai ......................... F01D 5/142
                                                            415/192
(Continued)

FOREIGN PATENT DOCUMENTS

| CN | 1469035 A | 1/2004 |
|----|-----------|--------|
| CN | 101302941 A | 11/2008 |

(Continued)

OTHER PUBLICATIONS

Extended European Search Report dated Sep. 30, 2015 for Application No. 12853021.9.
(Continued)

*Primary Examiner* — Jason Shanske
*Assistant Examiner* — Cameron Corday
(74) *Attorney, Agent, or Firm* — Birch, Stewart, Kolasch & Birch, LLP (57) ABSTRACT

A radial turbine comprises a plurality of nozzle vanes disposed along a circumferential direction inside a spiral scroll and configured to regulate a flow of a working gas from the scroll to a rotor blade, wherein each of the nozzle vane includes a leading edge bulging portion on both end portions in a width direction of an inlet leading edge portion, the leading edge bulging portion being bulged toward a pressure face side of the nozzle vane relative to a central portion, so that a vane angle is configured to correspond with an inflow angle of the working gas to be flown into the nozzle vane, and wherein each of the nozzle vane includes (Continued)

a trailing edge bulging portion on both end portions in a width direction of an outlet trailing edge portion, the trailing edge bulging portion being bulged toward the pressure face side relative to a central portion, so that an outflow angle of the working gas from the outlet trailing edge of the nozzle vane becomes uniform.

7 Claims, 6 Drawing Sheets (51) Int. Cl.
  *F01D 17/16* (2006.01)
  *F01D 5/14* (2006.01)
(52) U.S. Cl.
  CPC ......... *F05D 2220/40* (2013.01); *Y02T 10/144* (2013.01)

(56) References Cited

U.S. PATENT DOCUMENTS

| | | | | |
|---|---|---|---|---|
| 6,312,219 | B1* | 11/2001 | Wood | F01D 5/005 415/191 |
| 6,491,493 | B1* | 12/2002 | Watanabe | F01D 5/145 415/191 |
| 7,255,530 | B2* | 8/2007 | Vogiatzis | F01D 5/141 415/159 |
| 2005/0220616 | A1 | 10/2005 | Vogiatzis et al. | |
| 2015/0361802 | A1* | 12/2015 | Yoshida | F01D 5/043 415/119 |

FOREIGN PATENT DOCUMENTS

| CN | 102203396 A | 9/2011 |
|---|---|---|
| DE | 10 2009 020 591 A1 | 11/2010 |
| EP | 0 441 097 A1 | 8/1991 |
| JP | 60-12630 U | 1/1985 |
| JP | 61-37404 U | 3/1986 |
| JP | 4-214904 A | 8/1992 |
| JP | 6-81603 A | 3/1994 |
| JP | 6-272504 A | 9/1994 |
| JP | 8-21202 A | 1/1996 |
| JP | 8-109803 A | 4/1996 |
| JP | 2000-18004 A | 1/2000 |
| JP | 2002-129966 A | 5/2002 |
| JP | 2002-517666 A | 6/2002 |
| JP | 2003-120303 A | 4/2003 |
| JP | 2003-176702 A | 6/2003 |
| JP | 2003-254074 A | 9/2003 |
| JP | 2005-299660 A | 10/2005 |
| JP | 2005-351241 A | 12/2005 |
| JP | 2008-184971 A | 8/2008 |
| JP | 2011-509371 A | 3/2011 |
| WO | WO 2005/059313 A2 | 6/2005 |

OTHER PUBLICATIONS

Chinese Office Action dated Mar. 24, 2015 issued in corresponding Chinese Application No. 201280057391.X with an English translation.
Japanese Office Action, dated May 6, 2016, for Japanese Application No. 2012-256911, together with an English translation thereof.
International Preliminary Report on Patentability and Written Opinion of the International Searching Authority (Forms PCT/IB/338, PCT/IB/326, PCT/IB/373, and PCT/ISA/237) for International Application No. PCT/JP2012/079504, dated Jun. 12, 2014, with an English translation.
International Search Report and Written Opinion of the International Searching Authority (Forms PCT/ISA/210, PCT/ISA/220, and PCT/ISA/237) for International Application No. PCT/JP2012/079504, dated Feb. 12, 2013.
Notice of Allowance dated Oct. 10, 2015 issued to the corresponding Chinese Application No. 201280057391.X with an English translation.
Decision to Grant a Patent dated Aug. 1, 2016 issued in the corresponding Japanese Application No. 2012-256911 with an English Translation.

* cited by examiner

Related Art

RADIAL TURBINE

TECHNICAL FIELD

The present invention relates to a radial turbine, particularly to a structure of a nozzle vane disposed along a circumferential direction inside a spiral scroll to regulate a flow of a working gas from the scroll to a rotor blade of a turbine rotor.

BACKGROUND ART

As a relatively small turbocharger (exhaust turbocharger) for e.g. an internal combustion engine for automobiles, a radial turbine configured so that a working gas is permitted to flow in the radial direction from a scroll formed in a turbine casing into a rotor blade of a turbine rotor located inside the scroll to act on the rotor blade, and then the working gas is permitted to flow out in the axial direction, thereby to rotating-drive the turbine rotor, is usually employed.

Further, for improving the flow of the working gas flown into the rotor blade to improve the efficiency of the radial turbine, a radial turbine having a plurality of nozzle vanes disposed circumferentially on the outer circumference side of the rotor blade, angle of which nozzle vane is variable or fixed.

Figure 7:
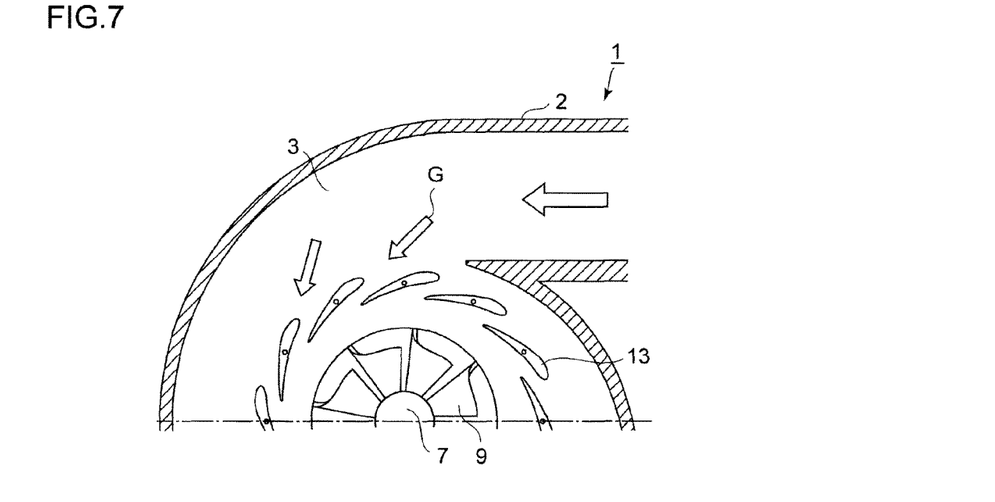
FIG. 7 is a cross-sectional view of a main part of the upper half of a radial turbine according to the present invention.
Figure 8:
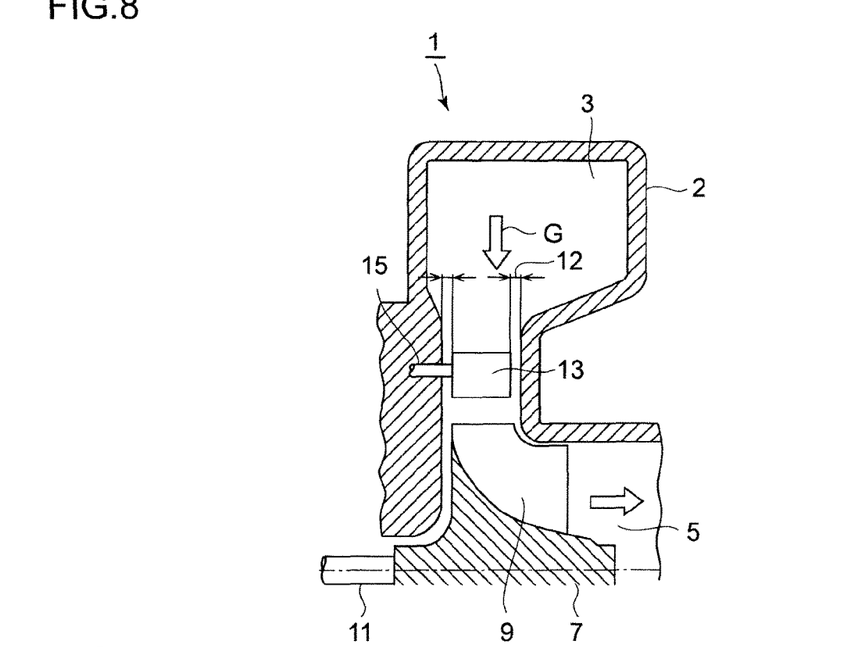
FIG. 8 is a cross-sectional view of a main part of the upper half of a radial turbine according to the present invention, along the rotational axis.

FIG. 7 and FIG. 8 are each a cross-sectional view of a main part of an example of a turbocharger employing a variable nozzle radial turbine. As shown in the figures, in a turbine casing 2, a scroll 3, and on the inner circumference side, a gas outlet passage 5 (not shown in FIG. 7) are provided.

Further, it is configured so that along the outer circumference of the turbine rotor 7, a plurality of rotor blades 9 are equally spaced in the circumferential direction and fixed. Further, the turbine rotor 7 is connected to a compressor (not shown) coaxially fixed by a rotor shaft 11, and the rotor shaft 11 is supported to a bearing casing by a bearing.

Further, inside the scroll 3, a plurality of nozzle vanes 13 disposed along the circumferential direction and configured to regulate a gas flow G from the scroll 3 to permit it to flow to the rotor blade 9 of the turbine rotor 7, is provided.

In FIG. 7 and FIG. 8, the nozzle vane 13 is of a variable type, which is rotatable around a support shaft 15 as a rotational axis, which is mounted to a body of the nozzle vane 13.

Prior art related to a nozzle vane of a radial turbine includes Patent Document 1 (JP 2005-351241 A), Patent Document 2 (JP 2011-509371 A), and Patent Document 3 (JP 2000-18004 A).

Patent Document 1 discloses a vane for a variable nozzle. In Patent Document 1, it is disclosed that in order to obtain a good nozzle performance across the entire load range of use including a low-load operating range of an exhaust turbine of e.g. a turbocharger for a automobile, a bulge turning fluid aside bulging from the airfoil section shape is provided on the downstream end part of a back surface of the vane over at least a part of blade length.

Patent Document 2 discloses a guide vane for a variable turbocharger, wherein the curvature line of the guide vane has at least one or more regions having a discontinuous course, whereby a variety of flow patterns can be obtained in accordance with desired purpose of use.

Patent document 3 discloses in a radial turbine having a plurality of nozzles, to suppress a nozzle loss caused by enlarging a nozzle flow-in angle in the vicinity of both wall surfaces of a hub side and a shroud side, the nozzle has a shape such that a blade angle in the vicinity of a hub side wall surface and a shroud side wall surface of part of a nozzle front edge is larger than a blade angle in the center passage.

CITATION LIST

Patent Literature

[PTL 1]
  JP 2005-351241 A
[PTL 2]
  JP 2011-509371 A
[PTL 3]
  JP 2000-18004 A

SUMMARY

Technical Problem

In the radial turbine as shown in FIG. 7 and FIG. 8, while revolving along the spiral of the scroll 3, the working gas is flown into between the nozzle vanes 13, a plurality of which is disposed in the circumferential direction. The gas inflow velocity into the nozzle vanes 13 has a distribution in the width (height) direction (Z direction in FIG. 6) of the nozzle vanes 13.

Figure 6:
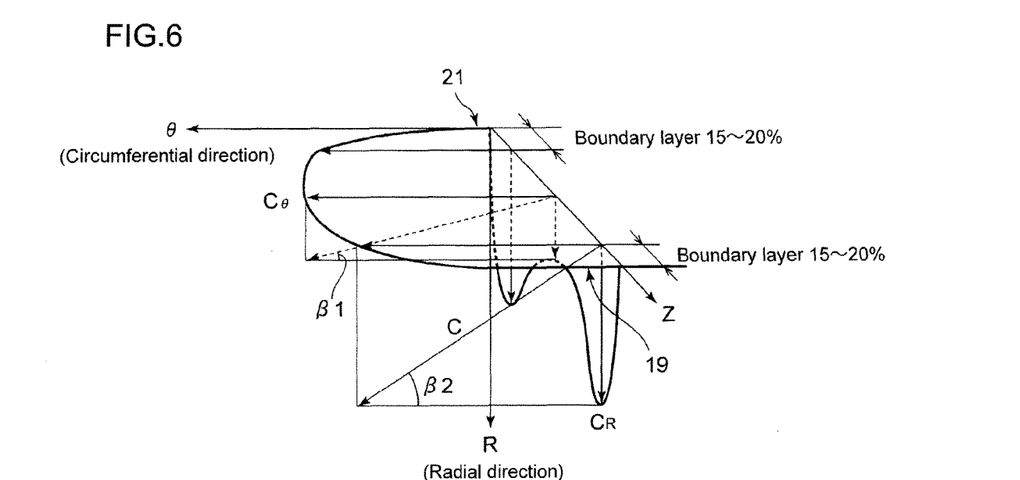
FIG. 6 is an explanatory diagram illustrating a change in a flow velocity due to an influence of a three-dimensional boundary layer at the inlet of a nozzle vane.

That is, as shown in FIG. 6, the gas inflow velocity C at the inlet of the nozzle vane 13 has a distribution such that due to a three-dimensional boundary layer formed in 15 to 20% of the entire width at the both sides of width W of the inlet leading edge portion 17, the velocity in the circumferential direction $C_\theta$ is large at the central portion of the inlet leading edge portion 17 and small at the corners of the both ends i.e. at the shroud side 19 and the hub side 21, and as shown in FIG. 6, the velocity in the radial direction $C_R$ is small at the central portion of the inlet leading edge portion 17 and large at the corners of the both ends i.e. at the shroud side 19 and the hub side 21.

Then, if a flow distribution i.e. a flow distortion of the flow gas in the direction of width W of the nozzle vane 13 is present, the flow loss at the nozzle vane 13 will be increased, which leads to reduction in the turbine efficiency.

Figure 9:
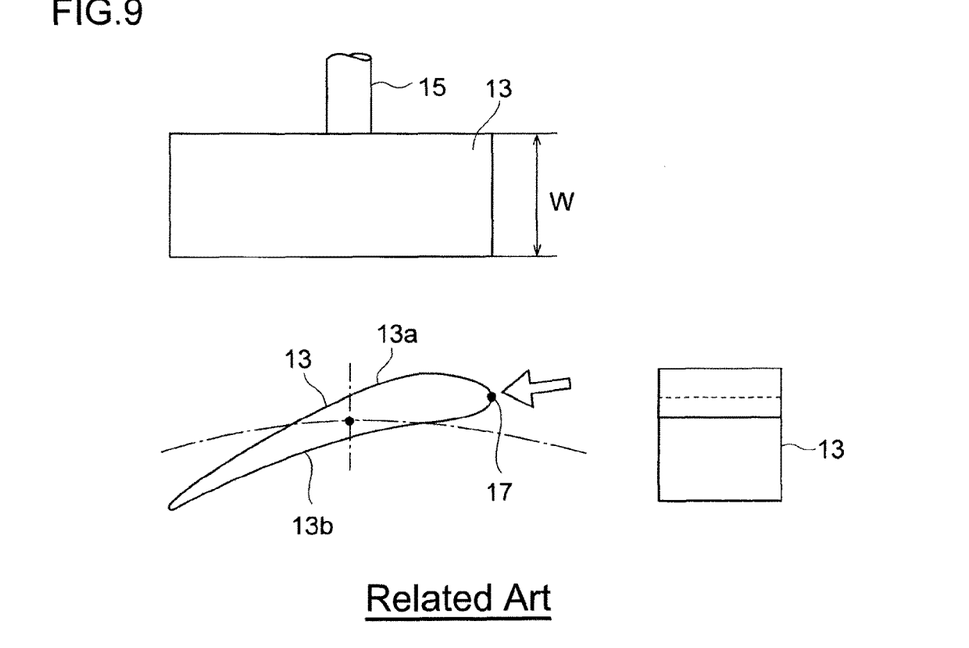
FIG. 9 is an overall view corresponding to FIG. 1, illustrating a nozzle vane according to a conventional art.

That is, there has been a problem such that when the gas inflow angle $\beta_2$ on the side of the wall of the inlet leading edge 17 i.e. the hub side 21 and the shroud side 19 becomes large relative to the central portion of the inlet of the nozzle vane 13 which is set in accordance with the optimum gas inflow angle $\beta_1$ into the nozzle vane 13, and the difference of the gas inflow angle $\beta$ i.e. the impact angle (incidence angle which is the difference between the vane angle and the gas inflow angle at the leading edge of the nozzle) thereby becomes large at the hub side 21 and the shroud side 19, the gas is flown into the nozzle vane 13 with an impact angle (incidence angle) on the negative pressure side 13b (See FIG. 9 where 13a is the pressure side) at the leading edge of the nozzle vane 13 to cause a impact loss at the inlet leading edge portion 17 of the nozzle vane 13, and the secondary flow loss is increased in the flow from the nozzle vane 13 toward the rotor blade 9, whereby the turbine efficiency may be reduced.

On the other hand, in the art disclosed in Patent Document 1, as described above, a bulge turning fluid aside bulging from the airfoil section shape is provided on the downstream end part of a back surface of the vane over at least a part of blade length to prevent a flow around the front side of the vane at the outlet of the downstream end of the vane. However, Patent Document 1 does not disclose to let the flow angle of a flow flown out from the downstream end part of the vane into the rotor blade of the turbine rotor become uniform.

Further, Patent Document 2 does not disclose uniformization of the flow angle of the working gas at the leading edge portion of the vane into which the working gas is flown from the scroll, or at the trailing edge portion.

Further, Patent Document 3 suggests uniformization of the incidence angle (impact angle) at the leading edge portion of the vane; however, it does not disclose uniformization of the flow angle of a flow flown out from the downstream end part of the vane into the rotor blade of the turbine rotor.

The present invention has been made in view of the above problems and is to provide a nozzle vane capable of reducing an impact loss of a working gas flown from a turbine scroll into the nozzle vane at the leading edge portion and uniformizing the outflow at the trailing edge portion of the nozzle vane to suppress the secondary flow loss at the nozzle vane or at the rotor blade thereby to improve the turbine efficiency.

Solution to Problem

To solve the above problems, the present invention provides a radial turbine comprising a plurality of nozzle vanes disposed along a circumferential direction inside a spiral scroll and configured to regulate a flow of a working gas from the scroll to a rotor blade of a turbine rotor, wherein each of the nozzle vane includes a leading edge bulging portion on both end portions in a width direction of an inlet leading edge portion, the leading edge bulging portion being bulged toward a pressure face side of the nozzle vane relative to a central portion, so that a vane angle of the inlet leading edge portion is configured to correspond with an inflow angle of the working gas to be flown into the nozzle vane across an entire area in the width direction, and wherein each of the nozzle vane includes a trailing edge bulging portion on both end portions in a width direction of a trailing edge portion, the trailing edge bulging portion being bulged toward the pressure face side relative to a central portion, so that an outflow angle of the working gas from the outlet trailing edge of the nozzle vane becomes uniform.

According to the invention, it is possible to reduce an impact loss of the working gas flown from the turbine scroll into the nozzle vane at the leading edge portion of the nozzle vane and uniformize the outflow at the trailing edge of the nozzle vane, whereby it is possible to reduce an operation loss by the rotor blade by uniformization of the flow direction of the working gas flown into from the nozzle to the rotor blade, thereby to improve the efficiency of the turbine as a whole.

In the present invention, it is preferred that the entire length of the nozzle vane at the both end portions in the width direction is longer than the central portion.

By employing such a configuration, the both ends in the width direction where the leading edge bulging portion is formed, and thereby the entire length, are extended, whereby a distance between adjacent nozzle vanes where the throat is formed by overlapping of the adjacent nozzle vanes may be ensured, and as a result, it is possible to sufficiently regulate the flow of the working gas by the throat. That is, the vane angle becomes large at the leading edge bulging portion, and thus the distance between adjacent overlapping nozzle vanes generally tends to be small; however, according to the present invention, it is possible to ensure such a length of an overlapping portion between adjacent nozzle vanes.

In the present invention, it is preferred that each of the nozzle vane is constituted by a variable nozzle vane supported rotatably around an intermediate portion of a nozzle length as a center of rotation, and the radial turbine is configured so that the leading edge bulging portion of one of two adjacent nozzle vanes among the nozzle vanes, and the trailing edge bulging portion of the other of the two adjacent nozzle vanes are close to each other when the nozzle vanes are in a totally-closed state.

By employing such a configuration, it is possible to make the throat as narrow as possible when the nozzle vanes are totally closed, and the performance of the turbine may not be deteriorated.

In the present invention, each of the nozzle vane is constituted by a variable nozzle vane supported rotatably around an intermediate portion of a nozzle length as a center of rotation, and a gap formed between the end portion of the nozzle and a sidewall within an annular region formed by linking each area around a rotational axis of the nozzle vane together, is narrower than a gap formed between the end portion of the nozzle and the sidewall outside the annular region.

In a variable nozzle, in order to permit the nozzle opening degree to be variable, a clearance (gap) is provided between an end portion of the nozzle and a wall surface. Since the gas passing through the clearance (the gas leaking without passing through the throat of the nozzle) may not be converted into velocity energy, the loss due to the nozzle clearance will be increased, whereby the efficiency of the turbine will be reduced.

Thus, by employing the above construction, the loss due to the nozzle clearance may be prevented, whereby it is possible to further improve the turbine efficiency, along with the above-described improvement of the turbine efficiency by reduction in the impact loss at the leading edge portion of the nozzle vane and uniformization of the outflow at the trailing edge portion of the nozzle vane.

In the present invention, it is preferred that the annular region is constituted by a region where a throat is formed by adjacent nozzle vanes when an opening degree of the nozzle vanes is within a range of from a middle opening degree to a small opening degree.

That is, the tendency of increase in the loss due to the nozzle clearance is significant in a region where gas expansion at the nozzle portion is large relative to at the rotor blade of the turbine rotor and where the throat area between the nozzles is small relative to the nozzle clearance. Thus, when the annular region is constituted by a region where a throat is formed by adjacent nozzle vanes when an opening degree of the nozzle vanes is within a range of from a middle opening degree to a small opening degree, where the influence of the nozzle on the turbine efficiency becomes large, the loss due to the nozzle clearance may be effectively prevented.

In the present invention, it is preferred that the both end portions in the width direction of the inlet leading edge portion of each of the nozzle vane is bulged in a direction of a vane angle increased by a range of from 2 degrees to 13 degrees toward the pressure face side of the nozzle vane from the central portion in the width direction. Further, it is preferred that the both end portions in the width direction of the outlet trailing edge portion of each of the nozzle vane is bulged in a direction of a vane angle increased by a range of from 2 degrees to 8 degrees toward the pressure face side of the nozzle vane from the central portion in the width direction.

Advantageous Effects

According to the present invention, it is possible to reduce an impact loss of a working gas flown from a turbine scroll into the nozzle vane at the leading edge portion and to uniformize the outflow at the trailing edge portion of the nozzle vane, to suppress the impact loss and the secondary flow loss at the turbine rotor blade, thereby to improve the turbine efficiency.

Further, it is possible to reduce the size of the nozzle clearance in a range of from a middle opening degree to a small opening degree of the nozzle, where the influence of the nozzle clearance on the turbine efficiency becomes large, thereby to further improve the turbine efficiency.

BRIEF DESCRIPTION OF DRAWINGS

FIG. 1 is an overall view illustrating a nozzle vane according to a first embodiment.

FIG. 3 is an overall view illustrating a nozzle vane according to a second embodiment.

DETAILED DESCRIPTION

Embodiments of the present invention will now be described in detail with reference to the accompanying drawings.

It is intended, however, that unless particularly specified, dimensions, materials, shapes, relative positions and the like of components described in the embodiments shall be interpreted as illustrative only and not limitative of the scope of the present invention.

First Embodiment

FIG. 7 and FIG. 8 are each a cross sectional view of a main part of an example of a turbocharger employing a variable nozzle radial turbine 1. In the figures, in a turbine casing 2, provided are a spiral scroll 3 and at the inner circumference side, a gas outlet passage 5.

Further, it is configured so that along the outer circumference of the turbine rotor 7, a plurality of rotor blades 9 are equally spaced in the circumferential direction and fixed. Further, the turbine rotor 7 is connected to a compressor (not shown) coaxially fixed by a rotor shaft 11, which is supported to a bearing casing by a bearing.

Further, inside the spiral scroll 3, a plurality of nozzle vanes 13 disposed along the circumferential direction and configured to regulate a flow of a working gas from the scroll 3 to the rotor blade 9 of the turbine rotor 7, is provided.

In FIG. 7 and FIG. 8, the nozzle vane 13 is rotatable around a support shaft 15 as a rotational axis, which is mounted to a body of the nozzle vane 13.

Figure 1A:
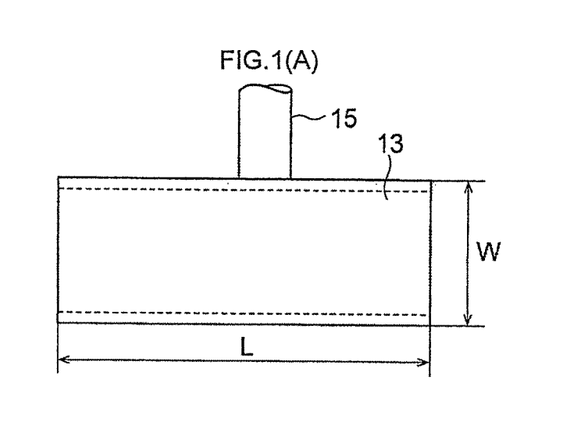
FIG. 1(A) is a plan view.
Figure 1B:
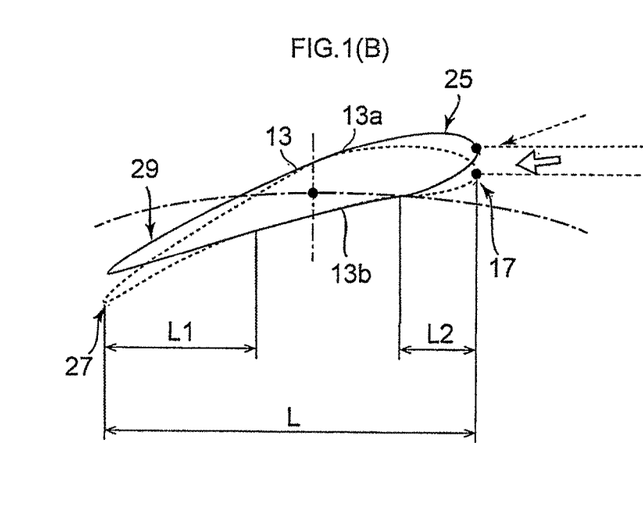
FIG. 1(B) is a front view.

The body of the nozzle vane 13 has a rectangle shape in the plan view shown in FIG. 1(A) and the cross-section thereof has a airfoil shape in the front view shown in FIG. 1(B). The nozzle vane 13 includes on both end portions in an inlet leading edge portion 17 into which the working gas is flown, leading edge bulging portions 25, 25 bulged toward a pressure face side 13a of the nozzle vane 13 relative to a central portion W0 of a width W.

In such a configuration, a leading edge vane angle (the angle directed by the leading edge) a of the inlet leading edge portion 17 is configured to correspond with a gas inflow angle β (see FIG. 1) of the working gas to be flown into the nozzle vane 13 across an entire area in the width direction W.

Further, the nozzle vane 13 includes on both end portions in a trailing edge portion 27, trailing edge bulging portions 29, 29 bulged toward the pressure face side 13a of the nozzle vane 13 relative to the central portion W0 of the width W.

As described above, the end portions at a shroud side 19 and a hub side 21 are bulged so that they become corresponding with the gas inflow angle β (see FIG. 6) of the working gas into the nozzle vane 13 in the entire region in the width direction of the inlet leading edge portion 17 and in the entire region in the width direction of the outlet trailing edge portion 27, of the nozzle vane 13.

Thus, in the entire region in the width direction of the inlet leading edge portion 17, the direction of the leading edge vane angel α becomes corresponding with the gas inflow angle β (see FIG. 6) of the working gas flown into the nozzle vane 13 in the entire region of the width W, whereby it is possible to reduce the impact loss of the working gas flown from the turbine scroll into the nozzle vane, at the leading edge portion of the nozzle vane.

Further, in the entire region in the width direction of the outlet trailing edge portion 27, the end portions at the shroud side 19 and the hub side 21 are bulged so as to become corresponding to the gas inflow angle β (see FIG. 6) of the working gas into the nozzle vane 13, and thus the outflow at the trailing edge portion of the nozzle vane may become uniform, and the direction of the flow of the working gas flown from the nozzle vane 13 into the rotor blade 9 may become uniform, whereby it is possible to reduce the operation loss by the rotor blade 9, thereby to improve the efficiency of the turbine as a whole.

Figure 1C:
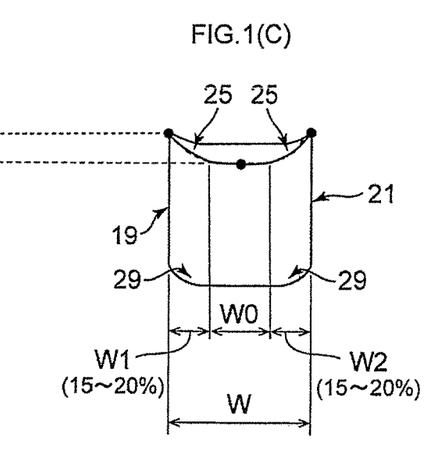
FIG. 1(C) is a side view.

The area of the region where the leading edge bulging portions 25, 25 are formed and the area of the region where the trailing edge bulging portions 29, 29 are formed are each preferably such that as illustrated in FIG. 1(B) and FIG. 1(C), in the direction of width W, W1 and W2 at the both ends are formed within a range of from 15 to 20%. They are each set as above so as to correspond to the region where the boundary layer is formed as illustrated in FIG. 6, and so as to correspond to the tendency such that the gas inflow angle β becomes large by the influence of the boundary layer in the region.

Further, as shown in FIG. 1(C), the shape of the leading edge bulging portion 25 is such that it is most bulged at the positions of the both end portions and the bulging degree is smoothly decreased toward the central portion W0.

Figure 1D:
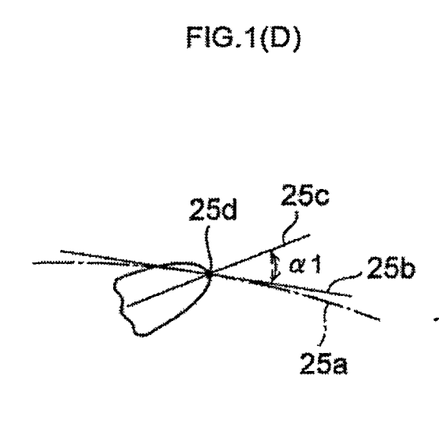
FIG. 1(D) is a diagram showing a shape of a leading edge bulging portion of the nozzle vane.
Figure 1E:
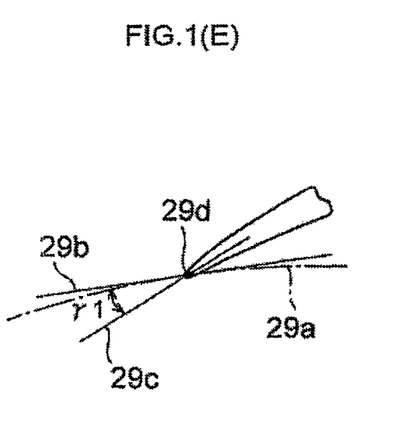
FIG. 1(E) is a diagram showing a shape of a trailing edge bulging portion of the nozzle vane.
Figure 1F:
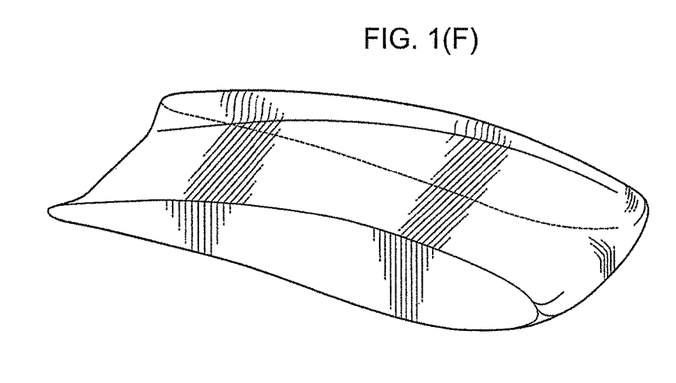
FIG. 1(F) is an isometric view of FIG. 1.

FIG. 1(D) is a diagram showing a shape of the leading edge bulging portion of the nozzle vane, wherein α1 is an angle between a tangent line 25b to a concentric circle 25a of which center is the rotational axis, through the point 25d on the leading edge, and a center line 25c of the leading edge of the nozzle. FIG. 1(E) is a diagram showing a shape of the trailing edge bulging portion of the nozzle vane, wherein γ1 is an angle between a tangent line 29b to a concentric circle 29a of which center is the rotational axis, through the point 29d on the trailing edge, and a center line 29c of the trailing edge of the nozzle. α1 and γ1 are set so that when the nozzle vane 13 is closed, the gap will not be widened.

Figure 2:
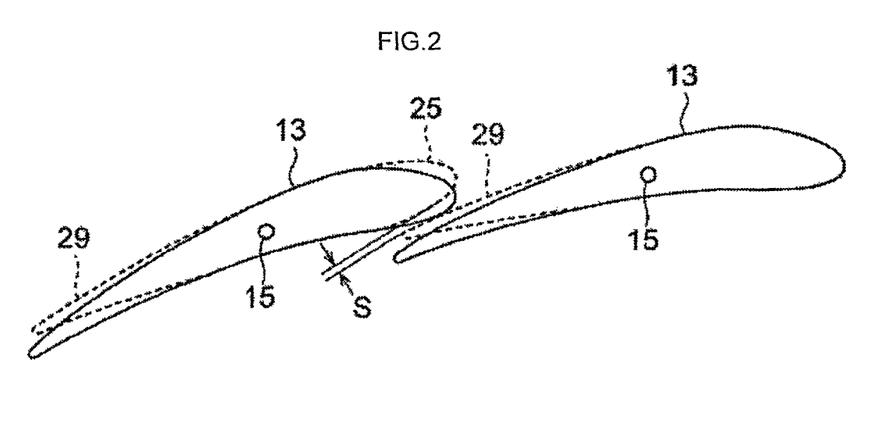
FIG. 2 is a diagram of nozzle vanes according to the first embodiment, which are disposed along the circumferential direction, in a totally-closed state.

Thus, as the leading edge bulging portion 25 and the trailing edge bulging portion 29 of adjacent two nozzle vanes 13, 13 have shapes which correspond with each other as illustrated in FIG. 2, they may become close to each other when the nozzle vanes 13 are in a totally-closed state. Therefore, it is possible to make the throat S formed between adjacent nozzle vanes 13 as narrow as possible when the nozzle vanes are totally closed, and thereby to maintain the performance of the turbine.

According to the first embodiment as described above, the impact loss of the working gas flown from the turbine scroll 3 into the nozzle vane 13 at the inlet leading edge portion 17 of the nozzle vane 13 may be reduced, and the outflow at the outlet trailing edge portion 27 of the nozzle vane 13 and thereby the direction of the flow of the working gas flown from the nozzle vane 13 into the rotor blade 9 may become uniform. Therefore, it is possible to reduce the loss of the flow of the working gas by the nozzle vane 13 and to reduce the operation loss by the rotor blade 9, thereby to improve the efficiency of the turbine as a whole.

Second Embodiment

The second embodiment will be described with reference to FIG. 3. In the second embodiment, the inlet leading edge portion 17 is extended in the length direction of the vane.

Figure 3A:
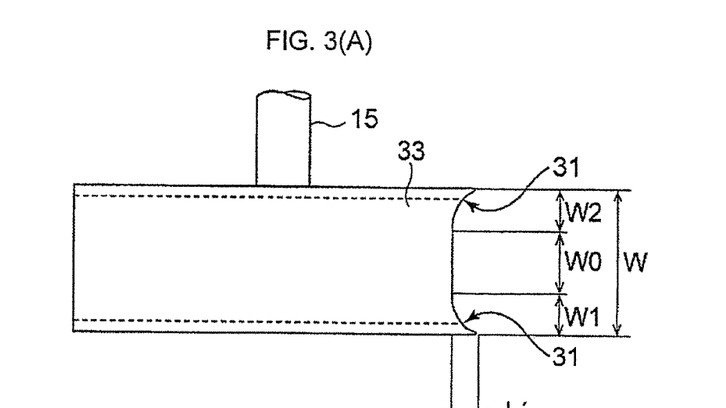
FIG. 3(A) is a plan view.
Figures 3B, 3C:
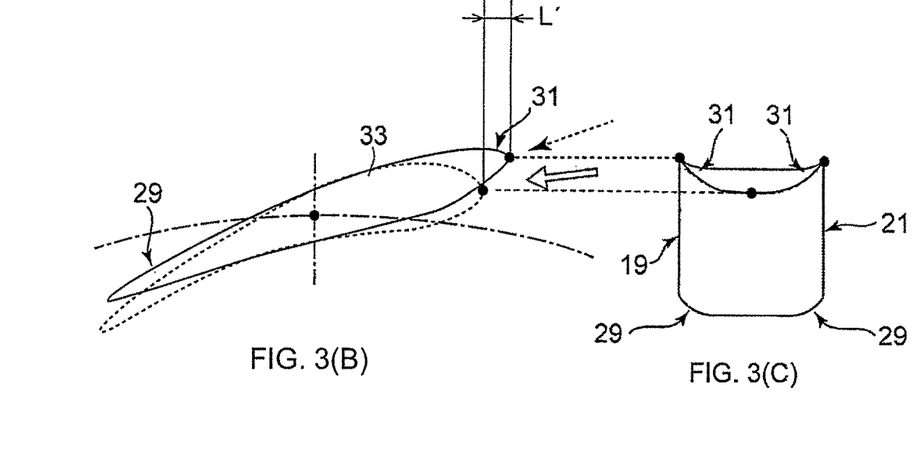
FIG. 3(B) is a front view.
FIG. 3(C) is a side view.
Figure 3D:
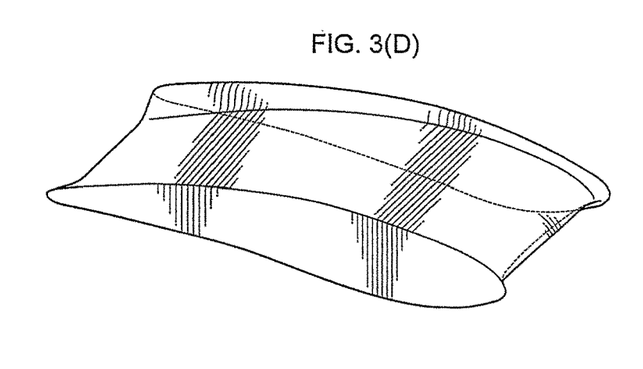
FIG. 3(D) is an isometric view of FIG. 3.

As illustrated in FIG. 3, the leading edge bulging portion 25 of the nozzle vane 33 is extended in the length direction by a length of L' to form an extended portion 31.

The extended portion 31, as illustrated in the plan view of FIG. 3(A), has a shape such that it is most extended at the end face portions at the shroud side 19 and the hub side 21 and the extension degree is gradually decreased from the end face portions toward the central portion W0. It may be such that in the direction of the width W, W1 and W2 at the both ends are formed within a range of from 15 to 20%. The description for this may be the same as for FIG. 1(C), that is, they are each set as above so as to correspond to the region where the boundary layer is formed as illustrated in FIG. 6, and so as to correspond to the tendency such that the gas inflow angle β becomes large by the influence of the boundary layer in the region.

According to the second embodiment, the length of the nozzle at the both end portions in the direction of the width W is larger than the central portion W0, and thus a length for overlapping of the adjacent nozzle vanes 33, 33 may be ensured, whereby the range of length where the throat S is formed may not be shortened, and the reduction in the flow velocity of the working gas flown between the adjacent nozzle vanes 33 may be prevented.

That is, the vane angle α becomes large at the leading edge bulging portion 25, and the vane angel γ becomes large at the trailing edge portion 29, and thus a problem such that a distance for forming a throat S cannot be ensured at the portion of the overlapping of the adjacent nozzle vanes 33, may arise; however, according to this embodiment, such a problem of the length of the overlapping may be solved.

As the second embodiment, an example in which only the leading edge bulging portion 25 is extended is described above; however, the trailing edge bulging portion 29 may also be extended. By extending both the leading edge side and the trailing edge side as above, the length of the overlapping of the adjacent nozzle vanes may be further ensured, whereby it is possible to ensure the length for the throat and thereby to prevent deterioration of regulation of the working gas.

Third Embodiment

The third embodiment will be described with reference to FIG. 4 and FIG. 5. According to the third embodiment, in addition to the first and second embodiments, gas leak from the nozzle clearance may be prevented, and the turbine efficiency may thereby be improved.

As illustrated in FIG. 6, in a variable nozzle, in order to permit the nozzle opening degree to be variable, a clearance (nozzle clearance) 12 is provided between an end portion of the nozzle and a wall surface. Since the gas passing through the clearance 12 (the gas leaking without passing through the throat of the nozzle) may not be converted into velocity energy, the loss due to the nozzle clearance 12 will be increased, whereby the efficiency of the turbine will be reduced.

Figure 4:
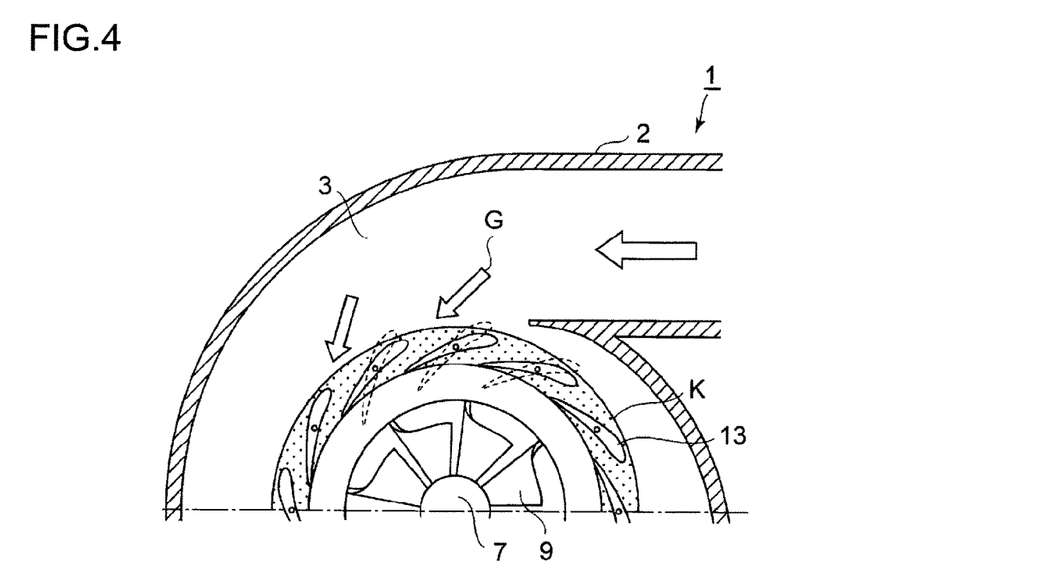
FIG. 4 is a cross-sectional view of a main part of the upper half of a radial turbine according to a third embodiment.
Figure 5A:
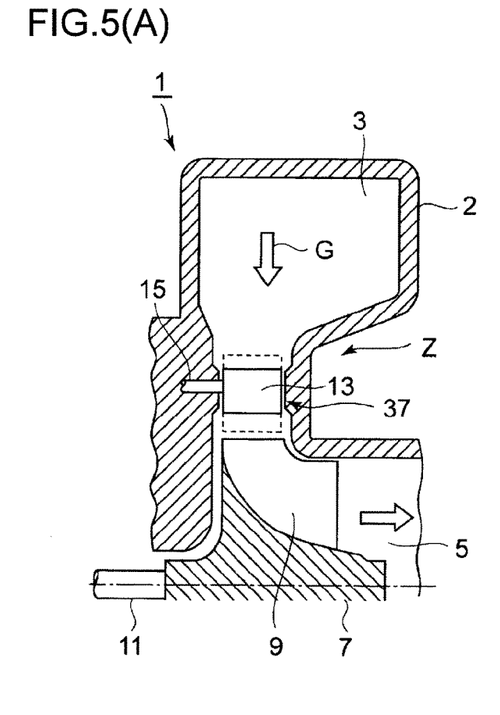
FIG. 5(A) is a cross-sectional view of a main part of the upper half of a radial turbine according to the third embodiment, along the rotational axis.
Figure 5B:
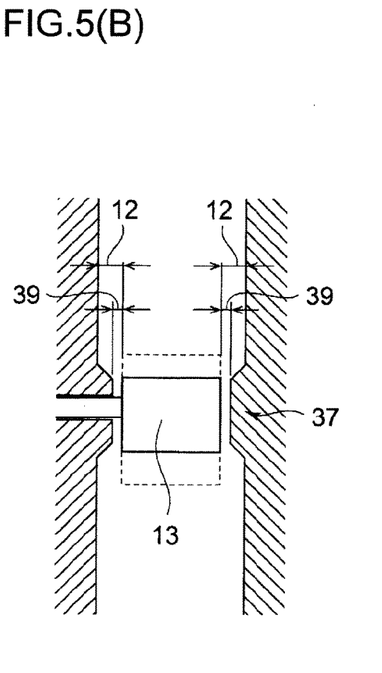
FIG. 5(B) is an enlarged view of the Z part in FIG. 5(A).

Accordingly, in the third embodiment, as illustrated in FIG. 4 and FIG. 5, a gap formed between the end portion of the nozzle vane 13 and a sidewall 37 is constituted by a nozzle clearance 39 which is narrower than the nozzle clearance 12 within an annular region K formed by linking together each area around a support shaft 15 to support the nozzle vane 13 rotatably around the intermediate portion of the nozzle length as the center of rotation, and is constituted by the nozzle clearance 12 outside the annular region K (see FIG. 5(B)).

The annular region K is constituted by a region where a throat is formed by adjacent nozzle vanes when an opening degree of the nozzle vanes 13 is within a range of from a middle opening degree to a small opening degree. That is, as a nozzle clearance loss Δη is proportional to (nozzle clearance area/throat area), the tendency of the increase in the loss due to the nozzle clearance 12 becomes particularly significant in a region where gas expansion at the nozzle portion is large relative to at the rotor blade 9 of the turbine rotor 7 and where the throat area between the nozzles is small relative to the nozzle clearance 12.

Thus, within the range of the nozzle opening degree of from a middle opening degree to a small opening degree where the influence of the nozzle on the turbine efficiency becomes large, the nozzle clearance is permitted to be a narrow gap 39, whereby the nozzle clearance loss may be effectively reduced.

Accordingly, in addition to the leading edge bulging portion 25 and the trailing edge bulging portion 29 according to the above first embodiment and second embodiment, by employing a structure for regulating the size of the nozzle clearance 12 according to the third embodiment, it is possible to improve the turbine efficiency.

INDUSTRIAL APPLICABILITY

According to the present invention, it is possible to reduce an impact loss of a working gas flown from the turbine scroll into the nozzle vane at the leading edge portion and to uniformize the outflow at the trailing edge portion of the nozzle vane, to suppress the secondary flow loss at the nozzle vane and the rotor blade, thereby to improve the turbine efficiency. Further, it is possible to reduce the size of the nozzle clearance in a range of from a middle opening degree to a small opening degree of the nozzle where the influence of the nozzle clearance on the turbine efficiency becomes large, thereby to further improve the turbine efficiency. Thus, the present invention is applicable to radial turbines including turbochargers (exhaust turbochargers), small gas turbines and expansion turbines.

The invention claimed is:

1. A radial turbine comprising a plurality of nozzle vanes disposed along a circumferential direction inside a spiral scroll and configured to regulate a flow of a working gas from the scroll to a rotor blade of a turbine rotor, each of said plurality of nozzle vanes being configured to be rotatable around a support axis mounted to a body of the nozzle vane as a rotational axis,
wherein each of the plurality of nozzle vanes includes,
an inlet leading edge portion;
an outlet trailing edge portion;
a leading edge central portion formed on a central portion in a width direction of the inlet leading edge portion, the leading edge central portion having two end portions;
a leading edge bulging portion formed on both end portions on an end side of the leading edge central portion in the width direction of the inlet leading edge portion, the leading edge bulging portion being bulged toward an outer surface side of the nozzle vane relative to the leading edge central portion;
a trailing edge central portion formed on a central portions in a width direction of the outlet trailing edge portion, the trailing edge central portion having two end portions; and
a trailing edge bulging portion formed on both end portions on an end side of the trailing edge central portion in the width direction of the outlet trailing edge portion, the trailing edge bulging portion being bulged toward the outer surface side of the nozzle vane relative to the trailing edge central portion,
wherein a width of the leading edge bulging portion is set to be within a range of from 15 to 20% relative to an entire width of the nozzle vane, and
wherein a width of the trailing edge bulging portion is set to be within the range of from 15 to 20% relative to the entire width of the nozzle vane.

2. The radial turbine according to claim 1, wherein the leading edge bulging portion is positioned further up on an upstream side in a length direction of the nozzle vane than the leading edge central portion.

3. The radial turbine according to claim 2, wherein each of the plurality of nozzle vanes is a variable nozzle vane supported rotatably around an intermediate portion of the nozzle vane in a length direction as a center of rotation, and the radial turbine is configured so that the leading edge bulging portion of one of two adjacent nozzle vanes among the nozzle vanes, and the trailing edge bulging portion of the other of the two adjacent nozzle vanes are close to each other when the nozzle vanes are in a totally-closed state.

4. The radial turbine according to claim 1, wherein
each of the plurality of nozzle vanes is a variable nozzle vane supported rotatably around an intermediate portion of the nozzle vane in a length direction as a center of rotation, and
a gap formed between a sidewall within an annular region of the spiral scroll and a portion of an end surface of the nozzle vane corresponding to the intermediate portion, is narrower than a gap formed between those portions of the end surface of the nozzle vane other than the intermediate portion and the sidewall outside the annular region, and
wherein the annular region is a region where a throat is formed by adjacent nozzle vanes when an opening degree of the nozzle vanes is within a range of from a middle opening degree to a small opening degree.

5. The radial turbine according to claim 1, wherein a vane angle of the leading edge bulging portion is larger than a vane angle of the leading edge central portion by a range of from 2 degrees to 13 degrees.

6. The radial turbine according to claim 1, wherein the a vane angle of the trailing edge bulging portion is larger than a vane angle of the trailing edge central portion by a range of from 2 degrees to 8 degrees.

7. A plurality of nozzle vanes disposed along a circumferential direction inside a spiral scroll and configured to regulate a flow of a working gas from the scroll to a rotor blade of a turbine rotor, each of said plurality of nozzle vanes being configured to be rotatable around a support axis mounted to a body of the nozzle vane as a rotational axis,
wherein each of the plurality of nozzle vanes includes,
an inlet leading edge portion;
an outlet trailing edge portion;
a leading edge central portion formed on a central portion in a width direction of the inlet leading edge portion, the leading edge central portion having two end portions;
a leading edge bulging portion formed on both end portions on an end side of the leading edge central portion in a width direction of the inlet edge portion, the leading edge bulging portion being bulged toward an outer surface of the nozzle vane relative to the leading edge central portion;
a trailing edge central portion formed on a central portion in a width direction of the outlet trailing edge portion, the trailing edge central portion having two end portions; and
a trailing edge bulging portion formed on both end portions on a side of the trailing edge central portion in the width direction of the outlet trailing edge portion, the trailing edge bulging portion being bulged toward the outer surface side of the nozzle vane relative to the trailing edge central portion, wherein
a width of the leading edge bulging portion is set to be within a range of from 15 to 20% relative to an entire width of the nozzle vane, and
a width of the trailing edge bulging portion is set to be within a range of from 15 to 20% relative to an entire width of the nozzle vane.

* * * * *